US010093784B2

(12) United States Patent
Fathi et al.

(10) Patent No.: US 10,093,784 B2
(45) Date of Patent: Oct. 9, 2018

(54) ON DEMAND RADIATION INDUCED CONSTRUCTIVE AND DECONSTRUCTIVE CHEMICAL REACTIONS

(71) Applicant: Immunolight, LLC., Detroit, MI (US)

(72) Inventors: Zakaryae Fathi, Raleigh, NC (US);
John Pacanovsky, Cary, NC (US);
Frederic A. Bourke, Jr., Aspen, CO (US)

(73) Assignee: IMMUNOLIGHT, LLC., Detroit, MI (US)

( * ) Notice: Subject to any disclaimer, the term of this patent is extended or adjusted under 35 U.S.C. 154(b) by 0 days.

(21) Appl. No.: 15/590,181

(22) Filed: May 9, 2017

(65) Prior Publication Data

US 2017/0240717 A1 Aug. 24, 2017

Related U.S. Application Data

(63) Continuation of application No. 15/183,110, filed on Jun. 15, 2016, now Pat. No. 9,676,918.

(60) Provisional application No. 62/175,683, filed on Jun. 15, 2015.

(51) Int. Cl.
| C08J 11/00 | (2006.01) |
| C08J 11/10 | (2006.01) |
| B32B 38/10 | (2006.01) |
| B32B 43/00 | (2006.01) |
| B32B 7/04 | (2006.01) |
| B32B 38/00 | (2006.01) |

(52) U.S. Cl.
CPC .............. *C08J 11/10* (2013.01); *B32B 7/04* (2013.01); *B32B 38/10* (2013.01); *B32B 43/006* (2013.01); *B32B 38/00* (2013.01); *C08J 2321/00* (2013.01); *Y10T 156/1158* (2015.01); *Y10T 156/1917* (2015.01)

(58) Field of Classification Search
CPC ......... B32B 38/10; B32B 43/006; B32B 7/04; Y10T 156/1158; Y10T 156/1917; C08J 11/10; C08J 2321/00
USPC ................................ 156/712, 753, 928, 939
See application file for complete search history.

(56) References Cited

U.S. PATENT DOCUMENTS

| 4,228,839 | A | * | 10/1980 | Bohm | ................ B29D 30/0005 152/504 |
| 5,492,135 | A | * | 2/1996 | DeVore | ............... A61F 9/00819 128/898 |
| 6,565,927 | B1 | * | 5/2003 | Drzal | ..................... B05D 3/062 427/398.1 |

(Continued)

FOREIGN PATENT DOCUMENTS

WO WO 2016/003888 A1 1/2016

OTHER PUBLICATIONS

International Search Report and Written Opinion dated Sep. 1, 2016 in PCT/US2016/037319.

*Primary Examiner* — Mark A Osele
*Assistant Examiner* — Nickolas Harm
(74) *Attorney, Agent, or Firm* — Oblon, McClelland, Maier & Neustadt, L.L.P.

(57) ABSTRACT

A method is provided for decomposition of a polymeric article, wherein the polymeric article contains a polymer and one or more energy modulation agents, by applying an applied energy to the polymeric article, wherein the one or more energy modulation agents convert the applied energy into an emitted energy sufficient to cause bond destruction within the polymer.

8 Claims, 16 Drawing Sheets

(56) References Cited

U.S. PATENT DOCUMENTS

| | | |
|---|---|---|
| 2004/0149382 A1 | 8/2004 | Giza et al. |
| 2004/0234717 A1 | 11/2004 | Sheats |
| 2005/0205186 A1* | 9/2005 | Wall ..................... B29C 73/163 |
| | | 152/504 |
| 2009/0133820 A1 | 5/2009 | Sato |
| 2009/0258154 A1 | 10/2009 | December et al. |
| 2012/0089180 A1* | 4/2012 | Fathi ................... B41J 2/17559 |
| | | 606/214 |
| 2012/0111462 A1* | 5/2012 | Majumdar ............. B29D 30/04 |
| | | 152/154.1 |
| 2012/0148791 A1 | 6/2012 | Yamanaka et al. |
| 2012/0152722 A1 | 6/2012 | Birnbach et al. |
| 2014/0065416 A1 | 3/2014 | Niwa |
| 2014/0367030 A1 | 12/2014 | Beam |

* cited by examiner

ON DEMAND RADIATION INDUCED CONSTRUCTIVE AND DECONSTRUCTIVE CHEMICAL REACTIONS

CROSS REFERENCE TO RELATED APPLICATIONS

The present application is a Continuation of U.S. application Ser. No. 15/183,110, filed Jun. 15, 2016, now allowed, and also claims priority to U.S. Provisional application Ser. No. 62/175,683, filed Jun. 15, 2015, the entire contents of which are hereby incorporated by reference. The present application is related to U.S. Provisional application Ser. No. 62/018,915, filed Jun. 30, 2014, entitled IMPROVED ADHESIVE BONDING COMPOSITION AND METHOD OF USE, the entire contents of which are hereby incorporated by reference. The present application is also related to PCT application PCT/US2015/021307, filed Mar. 18, 2015, entitled IMPROVED ADHESIVE BONDING COMPOSITION AND METHOD OF USE, the entire contents of which are hereby incorporated by reference. The present application is also related to U.S. Provisional application Ser. No. 61/955,547, filed Mar. 19, 2014, entitled ADHESIVE BONDING COMPOSITION AND METHOD OF USE, the entire contents of which are hereby incorporated by reference. The present application is related to U.S. Provisional application Ser. No. 61/955,131, filed Mar. 18, 2014, entitled ADHESIVE BONDING COMPOSITION AND METHOD OF USE, the entire contents of which are hereby incorporated by reference. The present application is related to U.S. Provisional application Ser. No. 61/331,990, filed May 6, 2010, and U.S. Provisional application Ser. No. 61/443,019, filed Feb. 15, 2011, the entire contents of each of which are hereby incorporated by reference. The present application is also related to U.S. provisional patent application 61/161,328, filed Mar. 18, 2009; U.S. provisional patent application 61/259,940, filed Nov. 10, 2009; U.S. Provisional Application Ser. No. 60/954,263, filed Aug. 6, 2007, and 61/030,437, filed Feb. 21, 2008; U.S. application Ser. No. 12/059,484, filed Mar. 31, 2008; U.S. application Ser. No. 11/935,655, filed Nov. 6, 2007; U.S. Provisional Application Ser. No. 61/042,561, filed Apr. 4, 2008; 61/035,559, filed Mar. 11, 2008; and 61/080,140, filed Jul. 11, 2008; U.S. patent application Ser. No. 12/401,478 filed Mar. 10, 2009; U.S. patent application Ser. No. 11/935,655, filed Nov. 6, 2007; U.S. patent application Ser. No. 12/059,484, filed Mar. 31, 2008; U.S. patent application Ser. No. 12/389,946, filed Feb. 20, 2009; and U.S. patent application Ser. No. 12/417,779, filed Apr. 3, 2009, the entire contents of each of which is hereby incorporated by reference. This application is related to U.S. patent application Ser. No. 13/102,277 filed May 6, 2011, the entire contents of which is hereby incorporated by reference. This application is related to U.S. patent application 61/735,754 filed Dec. 11, 2012, the entire contents of which are hereby incorporated by reference.

FIELD OF INVENTION

The invention pertains to the activation of suitably reactive chemistries inside polymeric materials to induce constructive chemical reactions such as curing; and, subsequently, having the ability to induce on demand the degradation of such polymeric materials. Such polymeric degradation facilitates the recycling of bonded parts and highly cross-linked polymer networks such as rubber tires. Such constructive and deconstructive chemical reactions are induced by the combination of an initiating radiation having suitable photonic energy and depth of penetration along with chemical additives that modulate the initiation energy.

DISCUSSION OF THE BACKGROUND (Photo-Degradation, Chain Scission in Biological Polymers):

Polymers are used in a wide range of applications from composite structures, automobile tires and adhesives to athletic shoes and fibers and are well known. One particularly important application subsequent to all domains of manufacturing is the field of reclaiming and recycling from already manufactured parts that have reached their end of life. Adhesives have proliferated many assembling processes to bond dissimilar parts. The properties of the bonding adhesive can be tailored to the part. Commercially available materials are formulated to meet various requirements, and in addition to the monomer(s) may contain particulate fillers such as metal, oxides, or dielectric powders, as well as various additives to control thermal conductivity, viscosity and other properties. However, once the functional life of a given product is over it becomes desirable to be able to reclaim valuable parts of the product (such precious metals) and recycle subassembly from the products (such as plastics) that can be reground for re-melting and re-use in making new products. The economics of recycling are not trivial. The more time, energy, and effort are involved to enable recycling, the less economically viable it becomes to harvest from old products to make new ones. The easier the methods that can be used to disassemble to reclaim and recycle, the better it is from a manufacturing stand point. Also, minimizing contamination of recycled products and recovering raw materials with the least contamination, the better it is from an economic stand point. For these reasons, methods that enable the disassembly of bonded parts (in pristine forms) would be highly desirable. A set of related technologies encompassing process, apparatus and methods are provided herein to take an existing polymer network that is highly reacted with good properties through an efficient degradation process to depolymerize it for ease of removal and de-bonding of joint parts while maximizing yield.

SUMMARY OF THE INVENTION

Accordingly, one object of the present invention is to provide reactive chemistries and associated methods of use to enable two objects to become de-bonded across their interface under X-Ray, e-beam and UV radiation that can be cured by chain scission, minimization of cross links, a combination of chain scission and breakage of crosslinks in the absence of line-of-sight. The novel reactive chemistries across an interface between two objects have to be complimentary and compatible with the reactive chemistries needed to form the adhesive leading to bonding as a first step of the process.

A further object of the present invention is to provide a method for de-bonding objects contained in an article at an interface between the objects, wherein the objects are joined at the interface through an intermediate layer by causing destruction of bonds within the intermediate layer through an applied energy.

Another object of the present invention is to provide a method for the decomposition of a polymeric article which contains one or more energy modulation agents by applying an applied energy to the polymeric article, wherein the one or more energy modulation agents convert the applied energy into an emitted energy sufficient to cause bond destruction within the polymer.

These and other objects of the present invention, individually or in combinations thereof, have been satisfied by the discover of a method for de-bonding objects contained in an article at an interface between the objects, wherein the objects are joined at the interface through an intermediate layer, comprising:

applying energy from a radiation source, wherein the energy is sufficient to cause destruction of bonds within the intermediate layer; and separating the two objects from one another.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DISCUSSION OF THE PREFERRED EMBODIMENTS

Figure 1:
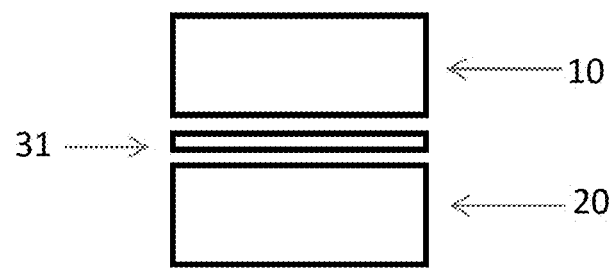
FIG. 1 shows a graphical representation of an embodiment of an adhesive assembly used according to the present invention.

An aspect of the present invention pertains to process, chemistries, applications and methods related to the incorporation of special chemistries (special additives) to be embedded in polymeric materials (including organic, inorganic and biological polymers), whereby the resultant formulation can be processed by first imparting energy (including but not limited to UV light, heat, X-Ray, E-beam) to promote chemical reactions (including but not limited to the formation of adduct, cross-linkages, addition); and, subsequently, after an elapsed time ranging from months to years depending on the intended functional life, the polymeric material can be made to undergo deconstructive reaction(s) to degrade (though loss of structural integrity, downsizing of molecular weight, breakage of crosslinks, breakage of specific bonds to name a few examples). The deconstructive chemical reactions are caused by exposing the polymeric material to a deeply penetrating radiation capable of being modulated by the special additives that in turn emit a least one radiation (distinct for the initiation radiation) which is capable of effectively causing the degradation of the said polymer(s) that have undergone an initial constructive reaction.

In one case of the present invention, the attributes of the novel material chemistry include, but are not limited to, the ability to form free radicals and to cause bond scission under X-Ray energy. The addition of UV radiation to X-Ray radiation leads to enhanced free radical formation and bond scission. The addition of heat to the UV and X-Ray energies leads to further enhancement of the free radical formation and bond scission leading to deconstructive reactions in the polymer network.

There are various possibilities for depolymerizing a network including the use of a highly energetic light such as UV light. Typically, depolymerization needs a direct exposure to UV light to occur where one surface is permeable to direct UV exposure enabling depth of penetration of such highly catalytic light. Most adhesives do not allow UV to penetrate more than a few atomic layers up to possibly microns, which make the application of external light ineffective at depolymerizing an established polymer network. However, with the use of special additives (preferably in powder form like phosphors) possessing the ability to modulate a highly energetic incident radiation with depth of penetration capability, such as X-Ray or E-beam, into UV light, a technology pathway to have dispersed UV centers across a polymer network can be utilized for depolymerizing purposes. This phosphor mediated technology can enable mechanisms within the thickness of adhesives that are enclosed with no line of sight and the materials need not to be UV transparent. Such degradation mechanisms include: 1-Photo-degradation of polymer backbones via exposure to UV radiation (in UVA, UVB and UVC) and 2-Cleavage of molecular backbones via exposure to UV radiation. Extended exposure to ultraviolet (UV) radiation may cause the significant degradation of many materials.

UV radiation causes photo oxidative degradation which results in breaking of the polymer chains, produces free radical and reduces the molecular weight, causing deterioration of mechanical properties and leading to useless materials after an unpredictable time. For example, Polystyrene (PS), one of the most important material in the modern plastic industry, has been used all over the world due to its excellent physical properties and low-cost. When polystyrene is subjected to extended levels of UV radiation especially in the presence of air, it undergoes a rapid yellowing and a gradual embrittlement. The mechanism of PS photolysis in the solid state (film) depends on the mobility of free radicals in the polymer matrix and their bimolecular recombination. Free hydrogen radicals diffuse very easily through the polymer matrix and combine in pairs or abstract hydrogen atoms from polymer molecules. Phenyl radicals have limited mobility. They may abstract hydrogen from the near surrounding or combine with a polymer radical or with hydrogen radicals.

The use of plastics in building applications is popular in the developing world because of the low cost and the ease of use of plastic components compared to the conventional metal, glass, mortar, wood and other materials. Plastics are used in other products such as outdoor furniture, fishing gear, and marine craft, which are also routinely used outdoors. Solar radiation reaching the surface of the earth is characterized by wave lengths from approximately 295 up to 2500 nm. The solar radiation classified as UV-B (280-315 nm) has an energy of 426-380 KJ mol-1. Fortunately, the higher energetic part of UV-B; 280-295 nm, is filtered by the stratosphere and does not reach the earth's surface, UV-A (315-400 nm), has energy between 389 and 300 KJ mol-1 and is less harmful for organic materials than UV-B. Visible (400-760 nm). If the photo induced degradation is initiated on the inside of the polymer, then all wavelengths can be utilized to influence rapid degradation.

Photodegradation is degradation of a photodegradable molecule caused by the absorption of photons, particularly those wavelengths found in sunlight, such as infrared radiation, visible light, and ultraviolet light. However, other forms of electromagnetic radiation can cause photodegradation. Photo degradation includes photo dissociation, the breakup of molecules into smaller pieces by photons. It also includes the change of a molecule's shape to make it irreversibly altered, such as the denaturing of proteins, and the addition of other atoms or molecules. A common photo degradation reaction is oxidation. Photo degradation in the environment is part of the process by which amber grisevolves from its fatty precursor. Light-induced polymer degradation, or photo degradation, includes the physical and chemical changes caused by irradiation of polymers with ultraviolet or visible light. In order to be effective, light must be absorbed by the substrate (polymeric system). Thus, the existence of chromophoric groups in the macromolecules is a pre-requisite for the initiation of any photochemical reaction.

Ketones, quinines, and peroxides are initiators for different reaction degradation or chemical modification occurring in organic compounds. They absorb light up to about 380 nm, which causes their excitation or cleavage to radicals. One may initiate polymer degradation and other transformation by abstraction of hydrogen atom from a macromolecule (PH) and formation of polymer alkyl radical (P.) The influence of low-molecular weight organic compounds such as benzophenone (BPh), anthraquinone (AQ) and benzoyl peroxide (BPo) on the photo processes of polystyrene has been studied. The results indicate that additives accelerate and increase the photo degradation and photo oxidation of polystyrene. Photo degradation may occur in the absence of oxygen (chain breaking or cross-linking) and the presence of oxygen (photo oxidative) degradation. The photo oxidative degradation process is induced by UV radiation and other catalysts (or both) and can be accelerated at elevated temperatures. Photo degradation of polystyrene (e.g. embrittlement and color change) can take place upon irradiation with a portion of UV light that is contained within sun light.

Nickel chelates are very effective quenchers of the triplet state of carbonyl groups in polyolefins. These chelates have been tested for photostabilization of polyisobutylene, poly butadiene Lala and Rabek (1980), polystyrene George (1974), PVC, poly (2,6-dimethyl-1,4-phenyloxide) and poly urethanes. (Chandra 1983; Osawa et al. 1979).

Nickel chelates can photostabilize a polymer by one or more of the following mechanisms.
  (i) Quenching of the excited state of carbonyl groups (ketones) through energy transfer.
  (ii) Quenching of the singlet oxygen (1O2)
  (iii) Decomposion of the hydroperoxides (OOH) radical, to non radical inactive species These compounds operate by reacting directly with polymeric hydroperoxide (ROOH). The decomposition of hydroperoxide in polymer to non radical derivatives was first demonstrated by Carlsson and Wiles (1974). Many metal complexes of sulphur containing ligands such as dialkylthiocarbonate and dialkylthiophosphate not only decompose hydroxide in PE film but are also effective in UV stabilization (as UV absorbers and excited state quencher).

Almost all synthetic polymers require stabilization against adverse environmental effects. It is necessary to find a means to reduce or prevent damage induced by environmental components such as heat, light or oxygen. Research into degradation and ageing of polymers is extremely intensive and new materials are being synthesized with a preprogrammed lifetime. There are many possible ways of polymer degradation: thermolysis, thermos oxidation, photolysis, photo oxidation, radiolysis etc. With the goal to increase lifetime of a particular polymeric material, two aspects of degradation are of particular importance: Storage conditions, and Addition of appropriate stabilizers. A profound knowledge of degradation mechanisms is needed to achieve the goal.

The term degradation of macromolecules denotes all processes which lead to a decline of polymer properties. It may eventually involve physical processes, such as polymer recrystallization, or denaturation of protein structures. Chemical processes related to degradation may lead to a reduction of average molar mass due to macromolecular chain bond scission or to an increase of molar mass due to crosslinking rendering the polymer insoluble. A wide variety of synthetic and naturally occurring high polymers absorb solar ultraviolet radiation and undergo photolytic, photooxidative, and thermos-oxidative reactions that result in the degradation of the material.

In recent years, the use of polymeric materials has rapidly increased but it is well established that rapid photo-degradation of these materials is possible when they are exposed to natural weathering (Guillet 1985; Hamid 2000; Rabek 1996; Bottino et al. 2003). This is a serious issue, with economic and environmental implications and therefore a large effort is focused on under-standing the changes that occur at molecular level and the degradation kinetics. Following different routes, UV radiation causes a photo-oxidative degradation which results in breaking of the polymer chains, produces radical and reduces the molecular weight, causing deterioration of mechanical properties and leading to useless materials, after an unpredictable time (Bottino et al. 2003; Gardella 1988). Damage by UV radiation is commonly the main reason for the discoloration of dyes and pigments, weathering, yellowing of plastics, loss of gloss and mechanical properties (cracking), sun burnt skin, skin cancer, and other problems associated with UV light. Most of the common polymers used in such applications contain photo stabilizers to reduce photo damage and to ensure acceptable life times under outdoor exposure conditions; without these additives, the UV induced degradation may proceed unchecked.

Biological Polymers Cleavage

A light-activated reagent that can bind to protein molecules and then sever them when irradiated by a 344-nm light could offer microbiologists a versatile tool for exploring the structure and behavior of proteins. Scientists could use this tool to sequence and manipulate proteins, controlling the reagent's scissor-like effect precisely, in part because the reagent can be selectively activated and in part because the molecule will bind only in specific sites on the protein.

The reagent was designed and studied by researchers at the University of Connecticut in collaboration with Glaxo Wellcome in Research Triangle, N.C., and Columbia University in New York. "So far we looked at several wavelengths from 310 to 380 nm, and the cleavage efficiency varies. The molecule absorbs light very strongly at [the 344 nm] wavelength," said Challa V. Kumar, an associate professor of chemistry at the University of Connecticut.

The designer molecule, N-(phenylalanine)-4-(1-pyrene) butyramide, or Py-Phe, binds in specific sites. The pyrene part is hydrophobic, and the phenylalanine carboxyl part is hydrophilic, so Py-Phe will bind on a protein only where a hydrophobic site is adjacent to a hydrophilic one.

Genetic Applications

Chemists and biologists speculate that the molecule can be used as a general reagent for cutting proteins, which would make it useful for molecular studies of proteins and peptides. Researchers have shown that a Py-Phe molecule can bind to lysozyme and albumin proteins and split them cleanly in two. "Many techniques can cut a protein with enzymes thermally," said Miguel Garcia Garibay, associate professor of chemistry at UCLA. But such methods make no distinction between events, so are suitable only for studying material in steady state. "This technique can be activated precisely, so it has applications in genetics to study processes of [molecular] interaction within a defined time span," Garibay said.

Kumar expects to begin tests on streptavidin, cholesterol oxidase and other key proteins involved in human disease states. "If we can selectively photodestruct key proteins, then we may target cancer cells or specific pathogens," he said.

To activate the protein scissors, researchers used a lamp and a monochromator. Light raises the Py-Phe radical to an excited state, initiating a sequence of molecular reactions that split the peptide bond.

Various examples of such polymeric materials intended in the present invention are provided by way of illustration and not a full inclusion of the scope of the present invention. These examples include adhesives, primers, poly-dAdT, DNA and cross-linked rubbers to name a few.

Adhesives (Groups 1, 2, 3 & 4):

An aspect of the present invention pertains to special additives to be embedded in standard or specialty adhesives, whereby the resultant formulation can be cured using standard curing methods (including UV light, heat, X-Ray, E-beam and part A: part B reactive chemistries of the appropriate stoichiometry); and, subsequently, the cured adhesive can be broken from within the adhesive thickness by applying a special energy with deeply penetrating property (such as X-Ray and E-beam), that can interact with the special adhesive and causes the structural disintegration of the special adhesive via different pathways including but not limited (the deterioration of the polymeric chains, the inducement of shorter molecular weights, the scission of certain molecular bonds, the reduction of crosslink density or the breakage of the cross-linkages). As such, the special adhesive according to the embodiments of the present invention comes apart and the assemblies (or subassemblies) that were bonded can be separated. The recovery of the assemblies and subassemblies can be done with higher yield compared to other methods hence facilitating any subsequent recycling steps. At least one part needs to have the special adhesive for bonding 2 different assemblies or subassemblies.

Certain embodiments of the present invention can preferably be practiced by using standard (commercially available) adhesives or by using specialty adhesives as outlined in the four following groups:

Group 1:

Commercially available polymeric adhesives, including, but not limited to, 2 part adhesives, UV curable adhesives and thermally curable adhesives, can be used in accordance to the current invention by adding a special additive (preferably in powder form). The additive can be added by weight percent in the range of 1% to 30%. The Commercially available adhesive is then cured using the recommended curing methods. The 2 parts assembly (or subassemblies) that have been joined using the commercially available adhesive goes through its functional life (that can be 5 years for an inkjet housing). After the functional life is over and the part is needed to be recycled then the assembly or subassembly is exposed to X-Ray where the special additives embedded in the adhesive absorb X-Ray energy and emits UV energy suitable for breaking bonds of the curable adhesive to make dis-assembling process easier and on demand. The various de-bonded parts (de-bonded assemblies or subassemblies) can be recycled. FIG. 1 shows a graphical depiction of this type of assembly wherein Parts A (10) and B (20) are joined using commercially available adhesive containing the special additive able to modulate deeply penetrating radiation (31).

Figure 2:
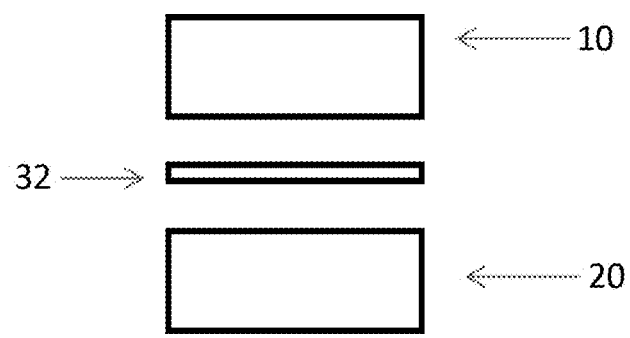
FIG. 2 shows a graphical representation of an embodiment of an adhesive assembly used according to the present invention.

Group 2:

Commercially available polymeric adhesives (of various kinds) including 2 part adhesives, UV curable adhesives and thermally curable adhesives can be used in accordance with the present invention by modifying certain bonds within the polymeric adhesive and chain and by adding a special additive (preferably an energy modulation agent, and preferably in powder form). The additive can be added by weight or mole percent in the range of 1% to 30%. The Commercially available adhesive is then cured using the recommended curing method. The 2 parts assembly (or subassemblies) that have been joined using the commercially available adhesive goes through its functional life. After the functional life is over and the part is needed to be recycled then the assembly or subassembly is exposed to X-Ray where the special additive absorbs X-Ray energy and emits UV energy suitable for breaking bonds of the curable adhesive to make the dis-assembling process easier and on demand. FIG. 2 shows a graphical depiction of this type of assembly wherein Parts A (10) and B (20) are joined using commercially available adhesive that include the modification of certain bonds and that contain special additives able to modulate deeply penetrating radiation for structural disintegration of the adhesive (32).

Figure 3:
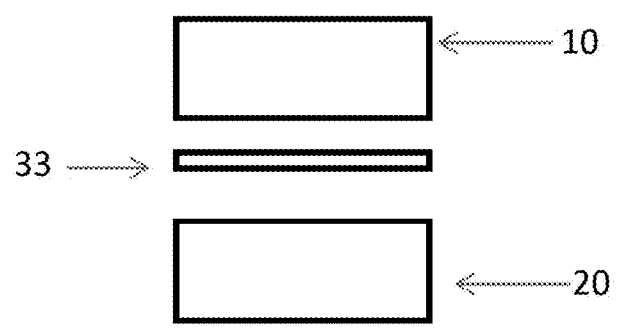
FIG. 3 shows a graphical representation of an embodiment of an adhesive assembly used according to the present invention.

Group 3:

UV curable polymeric adhesives (of various kinds) that can be cured using a first initiating energy that interact with a first additive that modulates the first initiating energy light into UV light suitable for activating the photo-initiator catalyzing the cure of the polymeric adhesive and by adding a special additive (preferably an energy modulation agent, and preferably in powder form). The additive can be added by weight or mole percent in the range of 1% to 30%. The adhesive is then cured using the recommended curing using the first initiating energy. The 2 parts assembly (or subassembly) that has been joined using the adhesive goes through its functional life. After the functional life is over and the part is needed to be recycled then the assembly or subassembly is exposed to a second initiating energy where the special additive absorbs the second initiating energy and emits UV energy suitable for breaking bonds of the curable adhesive to make the dis-assembling process easier and on demand. FIG. 3 shows a graphical depiction of this type of assembly wherein Parts A (10) and B (20) are joined using an adhesive containing additives that modulate a deeply penetrating energy to cure the adhesive and that further comprises special additives able to modulate deeply penetrating radiation for the structural disintegration of the adhesive (33).

Group 4: (Interlayering a Special Adhesive Between Two Standard Adhesives)

Figure 4:
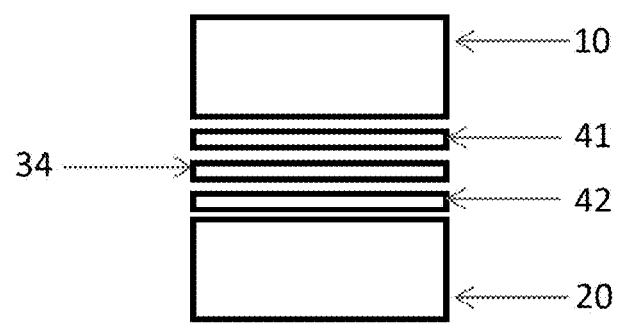
FIG. 4 shows a graphical representation of another embodiment of the present invention using an adhesive assembly.

Two Commercially available polymeric adhesives (of various kinds) including 2 part adhesives, UV curable adhesives and thermally curable adhesives can be used in accordance to the current invention. A third adhesive (an adhesive containing the special additive (preferably an energy modulation agent and preferably in powder form)) is added in the joint between the assemblies and subassemblies to be bonded. The additive can be added by weight or mole percent in the range of 1% to 30%. The Commercially available adhesives are then co-cured with the specialty adhesive using the recommended curing method. The 2 parts assembly (or subassemblies) that have been joined using the commercially available adhesive goes through its functional life. After the functional life is over and the part is needed to be recycled then the assembly or subassembly is exposed to X-Ray where the special additive absorbs X-Ray energy and emits UV energy suitable for breaking bonds of the curable adhesive to make dis-assembling process easier and on demand. FIG. 4 shows a graphical depiction of this type of assembly wherein Parts A (10) and B (20) are joined using an adhesive containing additives that modulate a deeply penetrating energy for the structural disintegration of the adhesive (34), having a layer of commercially available adhesive (41 and 42) between the adhesive (34) and each of Parts A (10) and B (20).

In the context of the above Groups 1-4, Parts A (10) and B (20) may be the same or different, and commercially available adhesives (41 and 42) of Group 4 may be the same or different.

Application Examples

The four groups of adhesives described can be used for wide range of applications such as the bonding parts and de-bonding of parts including:
deformable substrates attached to other deformable substrates including rubber to rubber;
deformable substrates attached to solid substrates such as rubber to metal, a semiconductor IC to a flexible substrate;
solid substrates to solid substrates such as silicon to FR4 or composite substrates to other composite substrate.

Figure 5:
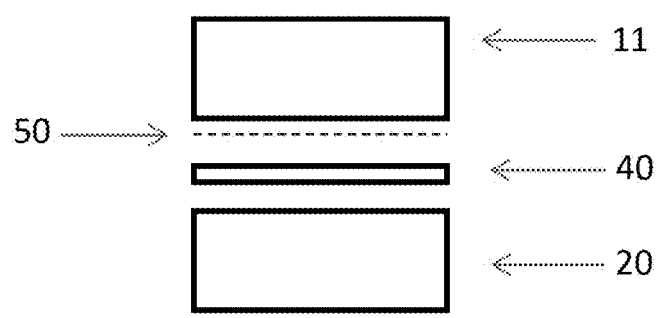
FIG. 5 shows a graphical representation of a further embodiment of the present invention using an adhesive assembly having a primed surface on one of the substrate portions.
Figure 6:
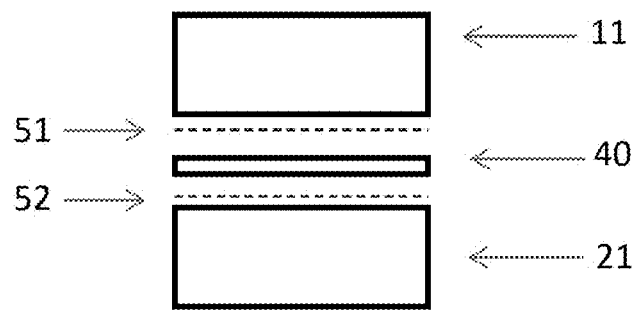
FIG. 6 shows a graphical representation further embodiment of the present invention using an adhesive assembly having a primed surface on both of the substrate portions.

Primers:

Another aspect of the present invention extends to special primers whereby the special primers that adhere to both the adhesive and the parts to be bonded is special in that it can be processed using standard process steps with the ability to become undone (to undergo deconstructive reactions) after being exposed to X-Ray. At least one part needs to be primed in this case (preferably both). In these cases both parts are free any contamination and the recycling yield out of the bonded parts is maximized. FIG. 5 shows one embodiment of this aspect of the invention wherein Part A' (11) has a primed surface primed with a special primer (50), which is joined with Part B (20) using a commercially available adhesive (40). FIG. 6 shows another embodiment of this aspect of the invention wherein Part A' (11) and Part B' (21) are both primed with special primers (51) and (52) (which may be the same or different), and joined together on the primed surfaces using a commercially available adhesive (40).

Figure 7:
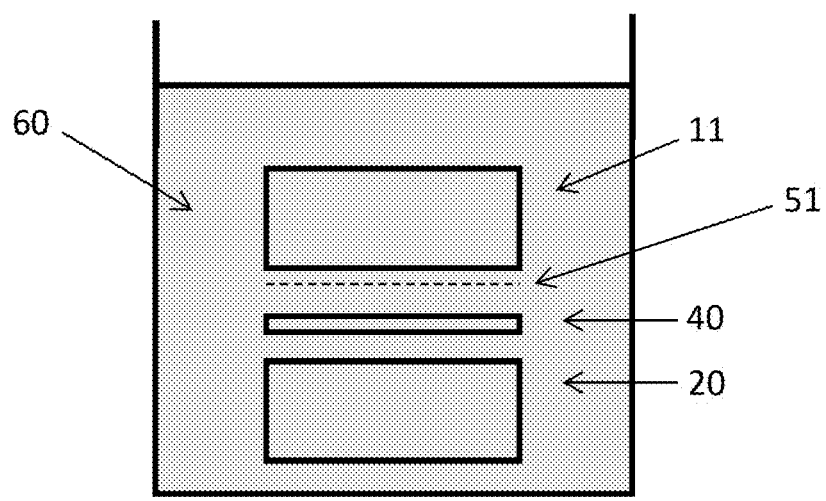
FIG. 7 shows a graphical repesentation of irradiating an adhesive assembly depicted in FIG. 5 with X-rays while submerged in an acid wash bath to speed decomposition.

Acid Digestion:

Another aspect of the present invention includes the use of assisted chemical digestion while the article is being exposed to the applied energy, such as X-Ray or E-Beam. Preferably, the chemical digestion occurs in a chemical digestion bath containing a medium and a reactive compound, wherein the reactive compound interacts with the intermediate layer between the objects to be de-bonded, in order to accelerate the de-bonding process. Suitable reactive compounds include, but are not limited to, various acidic and basic compounds reactive with the intermediate layer. Preferred reactive compounds include, but are not limited to, mineral acids such as hydrochloric acid, sulfuric acid, and phosphoric acid; organic acids such as formic acid and acetic acid; alkali and alkaline metal bases, such as alkali metal or alkaline metal hydroxides, carbonates, etc. FIG. 7 is a graphical representation of an embodiment of the present invention in which an embodiment according to FIG. 5 is placed in an acid wash bath (60) during X-ray irradiation in order to speed up the depolymerization.

Heat:

Heat can be added to speed up the kinetics of the various chemical reactions involved in the present invention. For example, if desired, the de-bonding process can be accelerated by the application of heat to the article being treated. The heating can be done at any desired temperature, and is preferably at a temperature of from room temperature to 200° C., depending on the medium. Further, the heating can be performed on the article being de-bonded during application of the applied energy, or the article can be both immersed in a chemical digestion bath (such as the above noted acid wash for example), while simultaneously heating and applying the applied energy to cause de-bonding. The effects of the chemical digestion bath and the heating can thus be maximized to cause accelerated de-bonding of the objects forming the article.

Fiber Reinforced Composites:

Fiber reinforced Composites of different kinds can be formed by a lamination process under heat and pressure. The constituents within a given ply (or layer or lamina) of the composites include fibers, matrix, coupling agents or coatings, fillers.

The matrix can be thermosetting or thermoplastic matrix. The thermosetting matrix can include (by way of illustration) diglycidyl ether of bisphenol A (DGEBA) epoxy resin and diethylene triamine (DETA) curing agent with fiber including carbon fibers or glass fibers.

Various thermoplastic resins can be used in the present invention including PEEK (Cictrex (ICI), PPS (Ryton (Philips Petroleum)), PSUL (Udel (Amoco)), PEI (Ultem (GE)), PAI (Torlon (Amoco)), PAI (Amoco), K-III (Avimid (Dupont)), LARC-TPI (Durimid (Rogers)). Various thermosetting resins can be used in the present invention including Bismaleimide (compimide 353 (Shell Chemical Co)), PMR-15, ACTP (Thermid 600 (National Starch and Chemical Corp)).

Figure 8A:
FIGS. 8A-8E are graphical representations of various forms of superposition of multiple plies in a multi-ply composite construction.
Figure 8B:
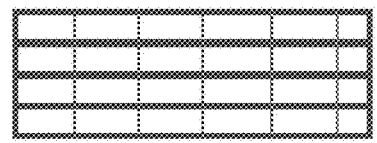
Figure 8C:
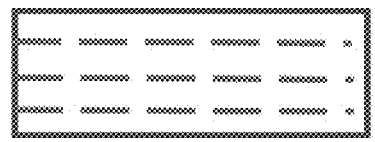
Figure 8D:
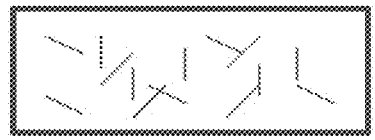
Figure 8E:
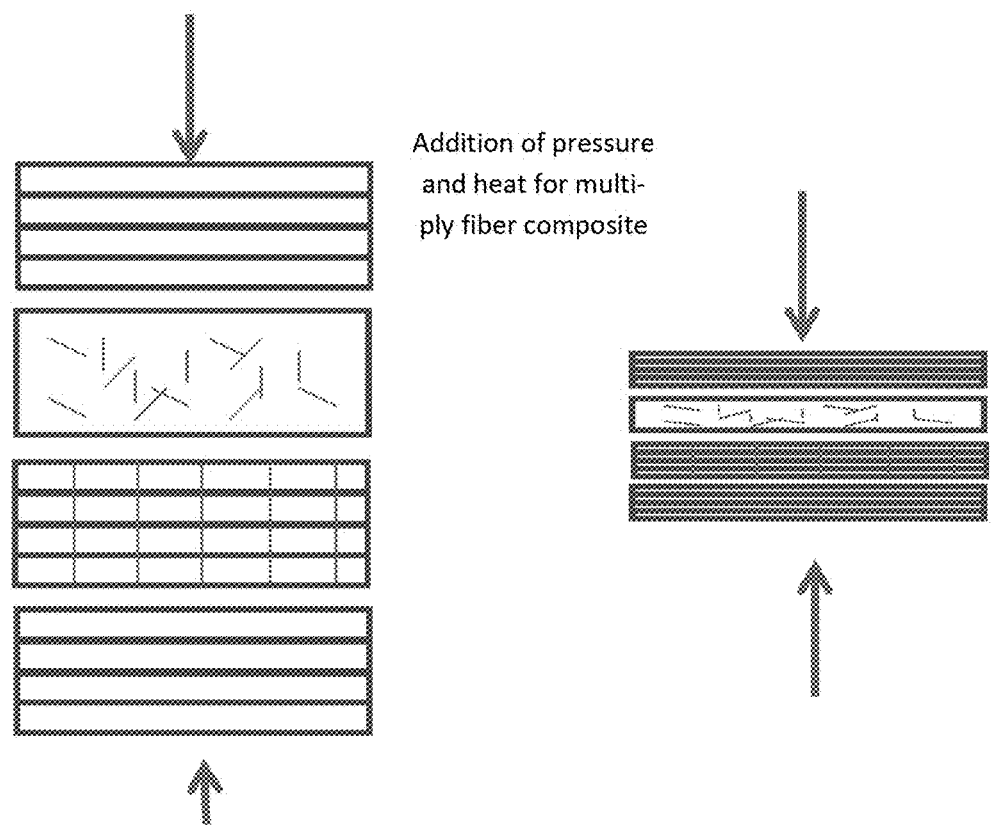
Figure 9:
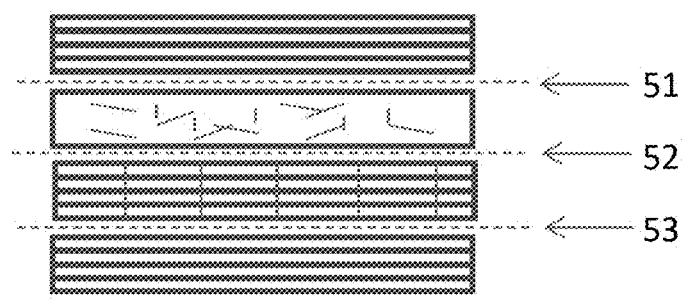
FIG. 9 is a graphical representation of the use of primer layers between adjacent plies in a multi-ply composite construction, from which the present invention can deconstruct the multi-ply structure and recover separate ply layers.

The superposition of multiple plies can be done in various forms as shown in FIGS. 8A-8E, including FIG. 8A: unidirectional continuous, FIG. 8B: bidirectional continuous, FIG. 8C: unidirectional discontinuous, and FIG. 8D: random discontinuous, followed by FIG. 8E: the lamination of the various plies, optionally with the application of pressure and heat. FIG. 9 shows a multi-ply construction using special primer layers (51, 52, and 53) between each two adjacent plies, which permits recovery of the separate ply layers by use of the present invention, which is not obtainable by conventional recycling methods.

Rubber Tires:

Recycling of rubber is very challenging. It requires considerable energy input to recover black carbon and steel out of the tire that the process is does not meet economic viability. Most rubbers are undergo Sulfur Cross Linking to improve cross link density. Vulcanization is an example of cross-linking. Schematic presentation of two "polymer chains" (blue and green) cross-linked after the vulcanization of natural rubber with sulfur (n=0, 1, 2, 3 . . . ).

Figure 10:
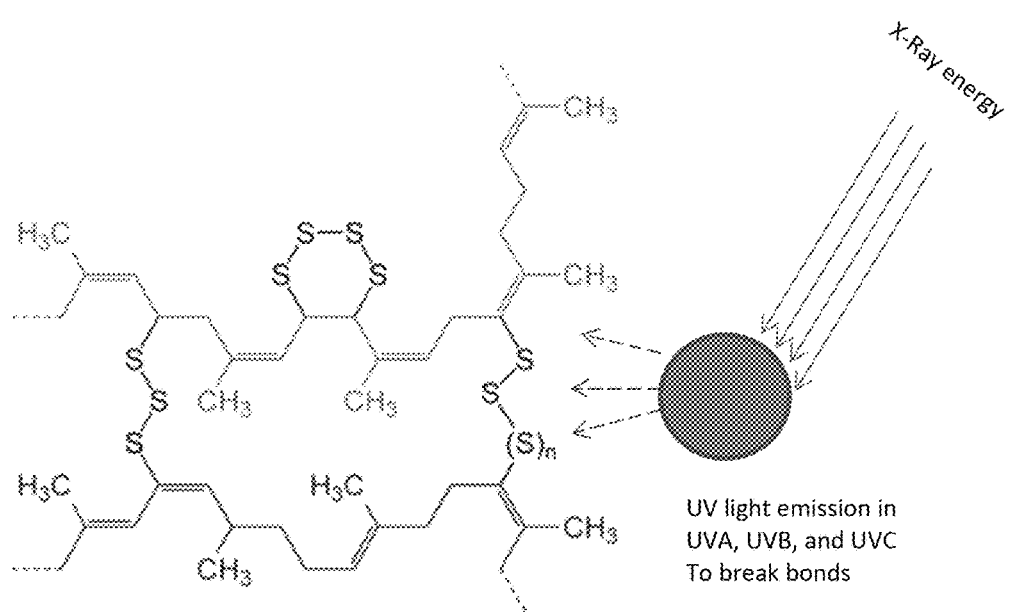
FIG. 10 is a graphical representation showing the use of an embodiment of the present invention to deconstruct vulcanization bonds present in rubber compositions.

The Phosphors can be use to break bonds in the rubber chains by virtue of their highly energetic energy. Phosphors can emit UVA, UVB and UVC to promote degradation of weak bond in the network. This embodiment is depicted in FIG. 10.

Phosphors can be excited under X-Ray using KV beams and MV beams. The MV beams will be powerful and cause more secondary electron cascade in the phosphors leading to more charged surfaces and to more creation of radical oxygen species.

Pressure Sensitive Adhesives:

UV curable pressure sensitive adhesives—UV curable pressure sensitive liquid and/or hot melt adhesives have been used for label, tape and self-adhesive insulation materials for several years. Although there is only a limited range of cross linkable raw materials available, formulation of these materials has opened a wide range of new adhesives. Traditionally, hot melt pressure sensitive adhesives are formulated with a polyurethane resin with low molecular weight, acrylate functional tackifying resins. Typical tackifying resins remain low molecular weight and thus have the desired properties to make the adhesive PSA. The acrylate moiety can participate in UV induced crosslinking of the short chain oligomer which results in the loss of its PSA characteristics and allows the material to be removed.

Many formulation factors can influence the performance of UV-curing pressure-sensitive adhesives (PSAs). Several basic material fundamentals should be considered, including polymer rheology, molecular weight, functionality and crosslink density. Most commercially available UV-curing PSA systems are based on free-radical curing liquid systems, therefore emphasis will be on this technology.

Materials Fundamentals (how to Build a Polymeric System):

An understanding of the general fundamental material properties required of PSAs and, specifically, UV-curing PSAs will provide the formulator with the tools required to minimize trial-and-error approaches and speed development time. The most important fundamental materials properties for PSA applications are:

Rheology

Molecular weight

Functionality

Rheology is the study of the change in form and flow of a matter. It is generally applied to viscoelastic materials. The rheological properties of the uncured adhesive are important with regard to application and coating. However, they are also important in the cured state, as they must be capable of a degree of flow to provide wetting and tack, yet have sufficient resistance to stress to provide for high adhesive strength. The correct rheological properties for a PSA require a careful balancing of these properties. To counteract the viscous flow, PSAs are based on very high-molecular-weight rubber polymers. These polymers rely on the entanglement of molecules to restrict flow. When high strength, heat resistance and chemical resistance are required, the entanglements themselves are not sufficient to restrict flow due to service stress. In these cases, the molecules are chemically crosslinked to provide for a three-dimensional network structure. This is the function of UV-curing mechanisms. In PSAs, the crosslink density or the molecular weight between crosslinks provides a measure of the balance that can be achieved between holding power and viscous flow. This crosslink density can also be measured by the glass-transition temperature of the adhesive. The higher the glass-transition temperature (Tg) for a specific adhesive, the higher the crosslink density or the lower the molecular weight between crosslinks. Functionality plays an important role in determining crosslink density. The functionality of a polymer is the number of reactive sites contained in the polymer molecule. The reactive sites are the connecting points for crosslinking to take place. Therefore, the higher the functionality, the higher the crosslink density, holding other factors constant. The discussion above considers the base polymer in the UV-curing PSA formulation. In order to further modify the system to provide for the breadth of properties required for a practical adhesive, many additives and modifiers are also required. Thus, the adhesive formulator has many tools at his disposal. In fact, there are more tools than in conventional PSA formulation, due primarily to the effect of UV dosage and possible oxygen inhibition on crosslink density.

The conventional liquid UV-curable PSA is comprised of four essential components: oligomers, monomers, photoinitiator and additives. The wide choice of raw materials available allows maximum latitude to achieve the desired properties. With conventional adhesives, the final performance properties are achieved during the resin polymerization process in a reactor. With UV technology, the polymerization takes place during the curing process. In effect, radiation-curable adhesives are a self-contained polymer factory of sorts.

Oligomers determine the overall properties of any adhesive crosslinked by radiant energy. Oligomers are moderately low-molecular-weight polymers, most of which are based on the acrylation of different structures. The acrylation imparts the unsaturation or C=C group to the ends of the oligomer; this serves as the functionality. The oligomer used in PSA applications is generally a multi-functional elastomeric polymer, such as an aliphatic urethane acrylates. Oligomers provide much of the shear strength in the UV PSA formulation. However, selection of the oligomer will also affect more viscous properties, such as tack and peel strength. The high-molecular-weights and glass-transition temperatures are generally well below room temperature to allow the oligomer to offer elastic properties at room temperature. This provides the viscoelasticity required for good tack and adhesion. Other factors that are affected by choice of oligomer include: reactivity, creep resistance, heat and chemical resistance, and color retention. Of course, cost is also an important factor as oligomers often have the greatest weight concentration in an adhesive formulation.

In the acrylate family, there are several possible UV-curing oligomers that can be used in PSA formulations. Each of these has certain advantages and disadvantages. Epoxy acrylates are one of the dominant oligomers in the radiation-curable coatings market. In most cases, epoxy acrylates do not have any free epoxy groups left from their synthesis but react through their unsaturation.

Urethane acrylates are produced by reacting polyisocyanates with hydroxyl alky acrylates, usually along with hydroxyl compounds, to produce the desired set of properties. Urethane acrylates are the most expensive of the acrylates. There are many different types of urethane acrylate oligomers that feature variations in the following parameters.

A variety of polyester acrylates is available, which enables a range of properties. They are generally low-viscosity resins that require no reactive diluents. Polyester acrylates provide performance properties between those of urethane acrylates and epoxy acrylates. A disadvantage of some types of polyester acrylate is their irritancy. This is particularly true for low-molecular-weight, highly reactive resins.

Polyester acrylates vary in functionality, chemical backbone and molecular weight. The influence of the functionality is similar to that for the urethane acrylates. The chemical backbone has a large influence on properties such as reactivity, color stability, hardness, reactivity, etc. Typically, the higher the molecular weight, the higher the flexibility and viscosity and the lower the reactivity.

Polyether acrylates have the lowest viscosity of the acrylate resins and are typically used with very little monomer or reactive diluents. They generally have high flexibility but relatively poor water and chemical resistance. To overcome these drawbacks, polyether acrylates are mostly used in combinations with other oligomers or monomers. An interesting property of some polyether acrylates is that they are compatible with water and can be used in water dilutable systems.

Acrylic acrylates, like urethane acrylates, have a very versatile chemistry, and there are many variations available to the formulator. These resins are often used because of their good adhesion to difficult substrates, such as low-surface-energy plastics.

Miscellaneous oligomers are generally specialty products that typically comprise melamine acrylates, silicone acrylates, etc. Other types of radiation-curable resins include unsaturated polyesters dissolved in styrene or acrylics. More recently, polyester resins have appeared on the market in the form of non-acrylic vinyl ether blends.

Monomers are primarily used to lower the viscosity of the uncured material and to facilitate application. However, they are also used to make adjustments of the formulation, such as improved surface wetting, leveling, and physical properties. Since most oligomers are too viscous to be applied with conventional coating equipment, most radiation-cured formulations are diluted down to a viscosity of 100-10,000 cps by adding a lower-molecular-weight monomer.

There are primarily two types of monomers: monofunctional, which are used primarily as a diluent; and multifunctional, which can be used as a diluent and crosslinker. Multifunctional monomers can be di-, tri-, and polyfunctional. The greater the functionality, the greater the crosslinking potential of the monomer. In this way, the functional monomers can be used to adjust properties of the final adhesive as well as to reduce viscosity.

Monomer chemistry also has an influence on the polymerization process and physical properties of the final adhesive. Increasing the monomer functionality leads to higher cure speed, higher Tg, higher crosslink density, higher shear strength, and greater chemical and thermal resistance, but lower flexibility and low conversion. A balance is generally required between adhesive strength and rigidity. Rigid adhesives have high shear strength and chemical/thermal resistance but exhibit low peel strength. More flexible adhesives have high peel and impact strength and better adhesion to plastic substrates, but they do not have the heat and chemical resistance of their more densely crosslinked (more rigid) counterparts.

The monomer used as a reactive diluent in a UV-curable resin plays a key role: it affects both the cure speed and the polymerization extent, as well as the properties of the final product. An increase in monomer functionality generally accelerates the curing process, but at the expense of the overall monomer conversion. Poor conversion leads to a crosslinked polymer, which contains a substantial amount of residual unsaturation. As a result of increased crosslink density, UV adhesives become more rigid and more resistant to chemicals, temperatures, and abrasion. However, they become less flexible and less resistant to impact and thermal cycling.

The effect of monomer on glass-transition temperature (which is a result of crosslink density) is an important tool for the formulator since the mechanical properties of the adhesives are strongly influenced by the Tg. If the Tg of the adhesive is below the expected service temperature, the adhesive will generally exhibit some of the following properties.

Flexible with a high degree of elongation
High peel and impact strength
Good resistance to thermal cycling
High thermal expansion coefficient (well suited for plastic substrates)
High degree of creep when exposed to constant stress
Poor blocking resistance (tacky)
High moisture uptake
Good chemical and temperature resistance On the other hand, if the Tg is above the expected service temperature, then the adhesive usually can be characterized as exhibiting some of the following qualities:

Rigid and to some extent brittle
Low impact and peel strength
Prone to crack propagation
Low thermal expansion coefficient
Poor resistance to thermal cycling
High shear strength
Low water uptake and swelling, and high barrier properties against chemicals and water
High temperature and chemical resistance.

The range of radiation-curable reactive monomers offered today is almost unmanageable. Formulators who have to provide optimum product performance at the best cost are sometimes overwhelmed by the vast array of choices. Because there are so many monomers available, it is important to keep in mind some general guidelines. There are four major parameters that contribute to the monomer's characteristics: functionality, chemical backbone, chemical structure and molecular weight.

The type and molecular weight of the backbone chain in a monomer can be varied to provide lower skin irritation, better flexibility, and faster cure speeds. Monomers can also be tailored for water-dispersible, adhesion-promoting and pigment-dispensing applications. In addition to providing the functions noted above, monomers could be used as a chemical intermediate to produce copolymers that enhance performance properties.

Photoinitiators

Photoinitiators absorb light and are responsible for the production of free radicals. High-energy free radicals induce crosslinking between the unsaturation sites of monomer, oligomers and polymers. Arguably, the most important additive is a photoinitiator for UV-cured adhesives. Photoinitiators are not needed for electronic beam-cured systems because the electrons themselves are able to initiate crosslinking by virtue of their higher energy. A typical photoinitiator for a UV-curable acrylic system is based on an aromatic keto compound. Often more than one photoinitiator is employed to provide for cure with a specific radiation source. The photoinitiator package will also need to be optimized for a given adhesive thickness and UV dosage.

The photoinitiator determines not only how but where the cure will occur. A high-surface-cure photoinitiator, for example, tends to increase shear properties while destroying the tack of the system. A good through-cure product may leave the surface very tacky but exhibit poor cohesive strength due to the fact that the surfaces are not well crosslinked.

Conventionally, UV curing requires that the adhesive has to be transparent to UV light in order to be cured. Filled or pigmented adhesives may pose a curing challenge. Another disadvantage is that one transparent substrate is normally required, and a limited depth of cure can be achieved. These disadvantages have generally been overcome by the development of dual-cure adhesive systems. In these systems, two independent curing mechanisms are incorporated into a single formulation. The adhesives can be cured first to a chemically stable state by UV radiation and then advanced to a full cure by a second means such as thermal cure.

Other Additives

The most common additives in all UV-cured resins are stabilizers, which prevent gelation in storage and premature curing due to low levels of light exposure. Color pigments, dyes, defoamers, adhesion promoters, flatting agents, wetting agents and slip aids are examples of other additives. Tackifiers are required in pressure-sensitive radiant-cured adhesives to improve the tack and pressure-sensitive nature or "stickiness" of the adhesive. Traditionally, these formulations have included tackifiers consisting of solid rosin esters of C-5 and C-9 hydrocarbon resins.

However, solid tackifing agents are difficult to incorporate into UV-curable oligomers and monomers without the use of a solvent and/or heat. This is often a time-consuming and expensive process. New low-viscosity oligomers have been developed that are said to provide excellent tack properties without the need of a solid resin additive.

The adhesive materials are typically dispensed as a thixotropic fluid in precise locations, and after all the parts are placed, the entire assembly is heated to a temperature necessary to polymerize the monomers or crosslink resins. The adhesion of two objects is done by adding the adhesive material at the interface of two objects to be bonded. The potential elimination of the addition of a third layer (the adhesive in this case) would be of great benefits. The tool used to dispense an adhesive is eliminated and the step required to cure the adhesive under heat is also obsoleted which saves overall cycle time.

As modern assembly methods evolve and more process steps are stream lined for a more efficient and more vertically integrated process steps to maximize assembly tool utilization, the permissible thermal budget and process cycle time during assembly continues to decrease. Faster manufacturing and higher yields are always of great benefits to the manufacturers.

The clear limitation of conventional photo-initiators is the need to have direct line-of-sight access to a suitable light source. The clear limitation of conventional thermally activated adhesive is the inherent poor thermal conductivity of the materials to be bonded which results in a long process time. The direct welding of two interfaces would be highly desirable.

Furthermore, the assemblies used for various commercial products are relatively small. While electron beam can deliver a desirable source of radiation, the electron beam is not compact and is more applicable to large form factors (such is the case of a wide web process for example). X-Ray energy is delivered through a more compact set of equipment and can integrated in various tools for more efficient tool utilization. In the present invention a bonding method that is vertically integrated is discussed.

Special Additives of the Present Invention: Light Modulating Particles, which May Contain Coatings:

The light modulating particles refers to any material that can absorb X-Ray and emit another wavelength preferably in the UV (which is a photo-catalytic light). By way of examples the light mediating particles can include (Phosphors, Quantum Dots and Scintillators, diamonds with adequate defect centers and densities). All these particles will be referred to as phosphors interchangeably and therefore examples given by way of preparations are applicable to QDs, diamonds and scintillators.

Figure 11A:
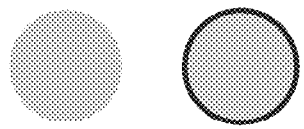
FIGS. 11A-11E are graphical representations showing various types of coated and uncoated phosphors according to the present invention.
Figure 11B:
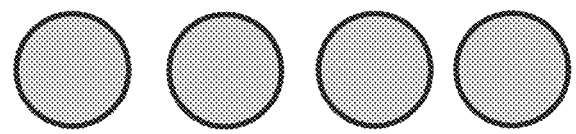
Figure 11C:
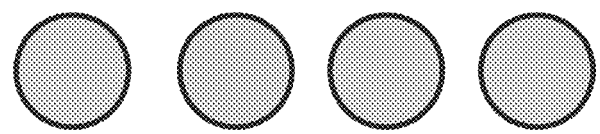

The various light modulating media (phosphor) particles were coated using PMMA. FIG. 11A is a graphical representation of an uncoated phosphor and a coated phosphor. The process was performed by first dissolving PMMA into Acetone and then rolling the phosphors with the solution in a ball mill using 5 mm zirconia as the grinding and mixing balls. The solution is then recovered and then dried. Upon acetone evaporation the particles were left with a surface coating of PMMA, as shown in FIG. 11B. If phosphors of different types are subjected to coating in a ball mill simultaneously, the result is a number of powders of mixed kind that are individually coated when ball milling is used, as shown in FIG. 11C. The thickness of the coating can be estimated from the surface area of the particles and the concentration of PMMA or of Ethyl cellulose that is dissolved in a diluent.

Figure 11D:
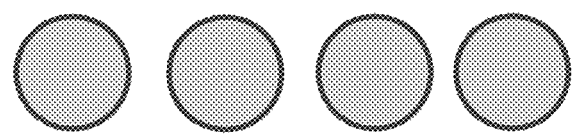

Furthermore, the PMMA or Ethyl Cellulose coating can include some of the desirable organic peroxide chemistries. These chemistries can be added in liquid forms and can be rolled in a jar in the ball mill in acetone. Upon drying the solvent, the PMMA or Ethyl cellulose coating is doped with the organic peroxide chemistry, which is depicted in FIG. 11D. As an example Dicumyl peroxide can be added at 1% by weight in the previous table.

Figure 11E:
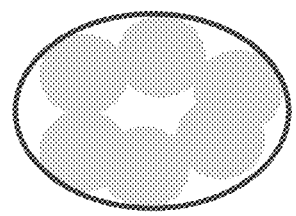

If the particles are not completely dispersed then an aggregate of the phosphors is coated with the PMMA resin, as depicted in FIG. 11E.

Figure 12A:
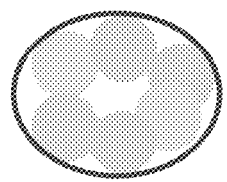
FIGS. 12A-12B are graphical representations showing coated mixed phosphor aggregates according to the present invention.
Figure 12B:
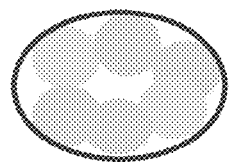

Furthermore, if phosphors of different kind are used then an aggregate of different phosphor can be coated using PMMA, as depicted in FIG. 12A, or coated and imparted with peroxide chemistry, as depicted in FIG. 12B. The Molecular Weight of the PMMA used can vary, and its selection is within the skill of one of ordinary skill in the art.

Figure 13A:
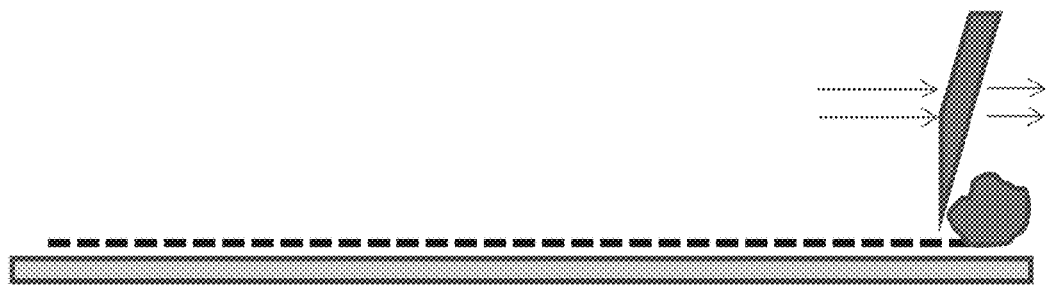
FIGS. 13A-13D are graphical representations showing the preparation of conformable phosphor coated films using a draw knife, cutting the films into desired die-cut shapes, and the ability of these films to accommodate stretching and maintaining its form across complex interfaces.
Figure 13B:
Figure 13C:
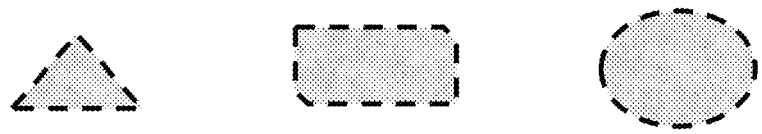
Figure 13D:
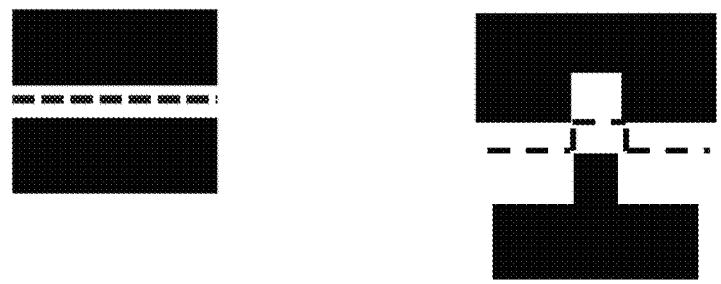

By adding the weight percent in the mix to high enough levels above 0.03 g per 1 g of phosphors, the coating is no longer forms a discontinuous phase where individual particles are coated; but, rather, the particles start to neck and to connect laterally which culminates in the formation of a film. At a ratio of 5 weight percent of higher, the necking of particles enables the formation of a film. The film is obtained by taking the slurry and using a drawing knife. The conformable film can be drawn using a 1 mill to 8 mill knife, as shown in FIG. 13A, providing a phosphor coated conformable film depicted in an overhead view in FIG. 13B. A die cutter can be used to obtain various geometries cut from the phosphor loaded conformable film as shown in FIG. 13C. The resulting conformable film, or its die-cut shapes, can accommodate stretching and maintaining its shape across complex interfaces, as shown in FIG. 13D.

Furthermore, the preparation of the film can be done using plasticizers in the mix prior to casting. About 2% to 5% by weight is a desirable range. Plasticizers with boiling points temperatures above room temperature remain embedded in the film and make the film's surface sticky. This is desirable in case the film is to be used between two objects to be adhered. Examples of suitable plasticizers include Tripropylene glycol. The addition of a small amount of Tripropylene glycol in the film (around 2% by weight of solids) and the placement of the film at the interface of two objects allows a good material transport between the objects and promotes bonding. Excessive Tripropylene glycol would prohibit adhesion.

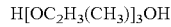

Tripropylene Glycol

MV Vs KV Beams

A further embodiment of the present invention provides a method for de-bonding objects contained in an article at an interface between the objects, wherein the objects are joined at the interface through an intermediate layer, comprising applying energy from a radiation source, wherein the energy is sufficient to cause destruction of bonds within the intermediate layer; and separating the two objects from one another. In this particular embodiment, the intermediate layer is an adhesive layer used to join the objects together, wherein the adhesive layer is formed from a curable adhesive composition comprising one or more curable monomers and one or more energy modulation agents. The adhesive layer is formed by applying an applied energy to the curable adhesive composition, wherein the one or more energy modulation agents convert the applied energy into an initiation energy which initiates polymerization of the one or more monomers and thus causes curing of the curable adhesive composition. In a preferred embodiment, the applied energy is a first ionizing radiation, more preferably selected from the group consisting of x-rays, gamma rays, and electron beams, most preferably x-rays. In a further preferred embodiment, the x-rays used as the applied energy for curing the curable adhesive layer have an energy of from 1 kV to 250 kV.

In the debonding portion of this embodiment, the one or more energy modulation agents are used to convert an externally applied energy into an energy sufficient to cause destruction of bonds within the previously formed adhesive layer. In a preferred embodiment, the externally applied energy is a second ionizing radiation, more preferably selected from the group consisting of x-rays, gamma rays, and electron beams, most preferably x-rays. In a further preferred embodiment, the second ionizing radiation used in the debonding portion of the embodiment has an energy of 1 MV or higher, more preferably x-rays having an energy of 1 MV or higher.

Alternatively, rather than using low energy (on the order of kV's) to cure and high energy (on the order of MV's) to depolymerize, it is also possible to use a low dose and/or lower dose rate of energy to cure, with a higher dose and/or higher dose rate to cause depolymerization.

Initiation Energies

KV Vs MV Vs E-Beam

Listed below are the approximate wavelength, frequency, and energy limits of the various regions of the electromagnetic spectrum.

|  | Wavelength (m) | Frequency (Hz) | Energy (J) |
|---|---|---|---|
| Radio | $>1 \times 10^{-1}$ | $<3 \times 10^{9}$ | $<2 \times 10^{-24}$ |
| Microwave | $1 \times 10^{-3}$-$1 \times 10^{-1}$ | $3 \times 10^{9}$-$3 \times 10^{11}$ | $2 \times 10^{-24}$-$2 \times 10^{-22}$ |
| Infrared | $7 \times 10^{-7}$-$1 \times 10^{-3}$ | $3 \times 10^{11}$-$4 \times 10^{14}$ | $2 \times 10^{-22}$-$3 \times 10^{-19}$ |
| Optical | $4 \times 10^{-7}$-$7 \times 10^{-7}$ | $4 \times 10^{14}$-$7.5 \times 10^{14}$ | $3 \times 10^{-19}$-$5 \times 10^{-19}$ |
| UV | $1 \times 10^{-8}$-$4 \times 10^{-7}$ | $7.5 \times 10^{14}$-$3 \times 10^{16}$ | $5 \times 10^{-19}$-$2 \times 10^{-17}$ |
| X-ray | $1 \times 10^{-11}$-$1 \times 10^{-8}$ | $3 \times 10^{16}$-$3 \times 10^{19}$ | $2 \times 10^{-17}$-$2 \times 10^{-14}$ |
| Gamma-ray | $<1 \times 10^{-11}$ | $>3 \times 10^{19}$ | $>2 \times 10^{-14}$. |

Figure 14:
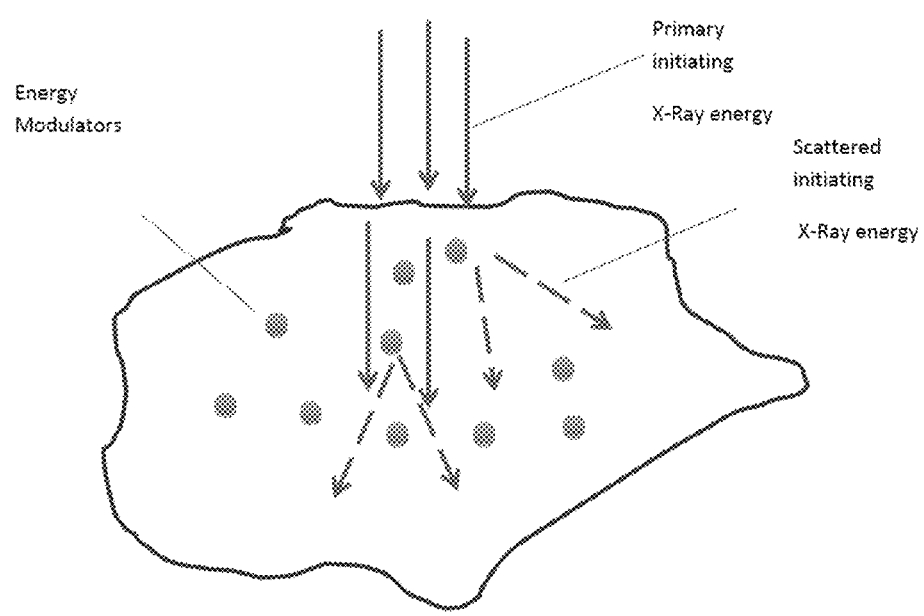
FIG. 14 is a schematic depicting conversion of primary and scattered initiating energy such as x-rays by energy modulation agents in a medium.

As shown in FIG. 14, initiation energy in the form of radiation from the initiation energy source permeated throughout the medium. The initiation energy source can be an external energy source or an energy source located at least partially in the medium. Activatable agents and/or the energy modulation agents can include plasmonics agents which enhance either the applied energy or the energy emitted from the energy modulation agents so as to directly or indirectly produce a change in the medium.

In various embodiments, the initiation energy source may be a linear accelerator equipped with at least kV image guided computer-control capability to deliver a precisely calibrated beam of radiation to a pre-selected coordinate. One example of such linear accelerators is the SMART-BEAM™ IMRT (intensity modulated radiation therapy) system (from Varian Medical Systems, Inc., Palo Alto, Calif.) or Varian OBI technology (OBI stands for "On-board Imaging", and is found on many commercial models of Varian machines). In other embodiments, the initiation energy source may be commercially available components of X-ray machines or non-medical X-ray machines. X-ray machines that produce from 10 to 150 keV X-rays are readily available in the marketplace. For instance, the General Electric DEFINIUM series or the Siemens MULTIX series are two non-limiting examples of typical X-ray machines designed for the medical industry, while the EAGLE PACK series from Smith Detection is an example of a non-medical X-ray machine. Another suitable commercially available device is the SIEMENS DEFINITION FLASH, (a CT system), by Siemens Medical Solutions. As such, the invention is capable of performing its desired function when used in conjunction with commercial X-ray equipment.

According to another embodiment of the invention, energy modulation agents can be placed in the vicinity of a fluid medium (e.g., a liquid or other fluid-like medium) and held inside a container. The container can be made of a material that is "transparent" to the radiation. For example, plastic, quartz, glass, or aluminum containers would be sufficiently transparent to X-rays, while plastic or quartz or glass containers would be transparent to microwave or radio frequency light. The energy modulation agents can be dispersed uniformly throughout the medium or may be segregated in distinct parts of the medium or further separated physically from the medium by encapsulation structures. A supply would provide the medium to the container.

Figure 15:
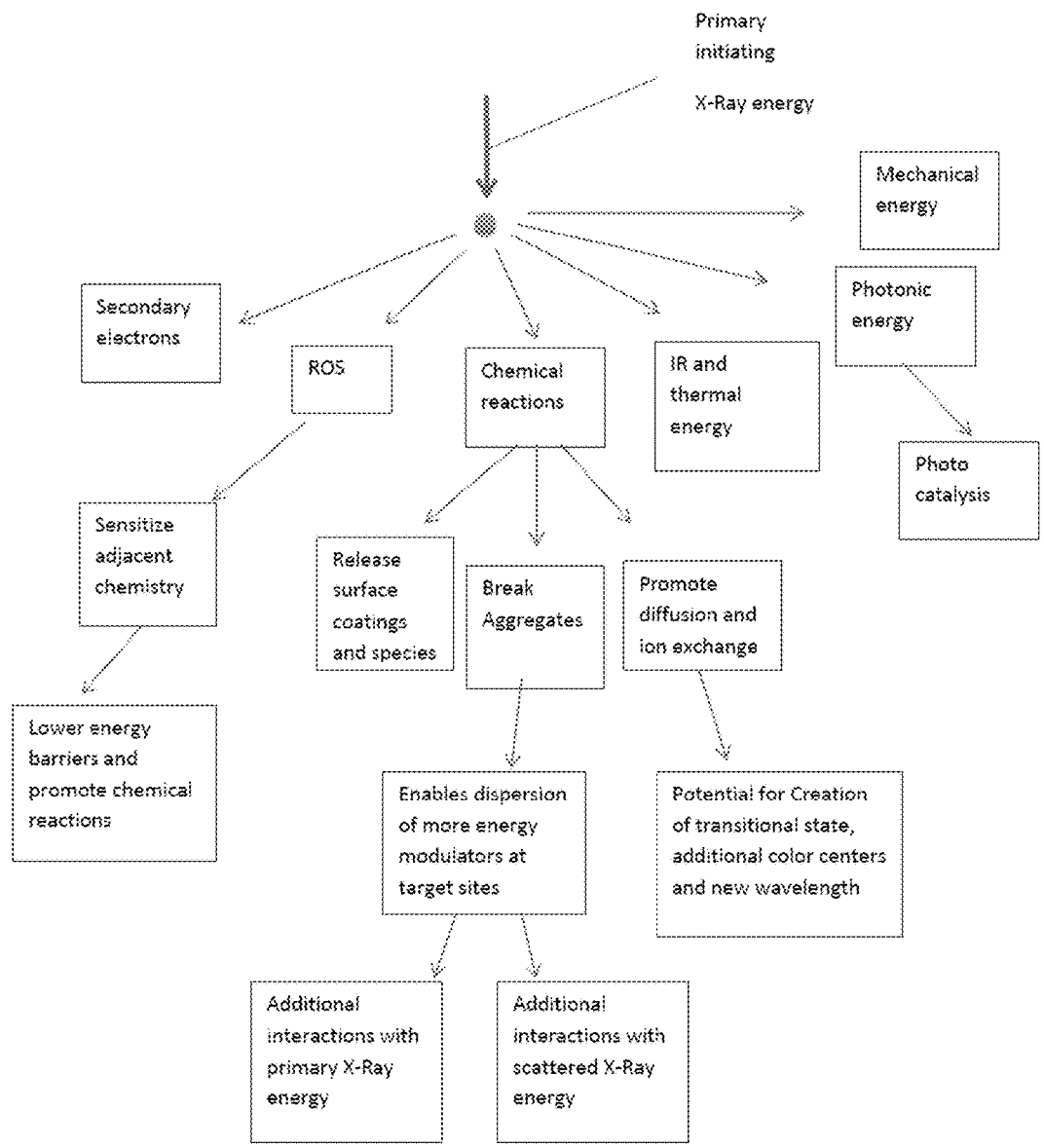
FIG. 15 is a schematic depicting x-ray scattering events and interactions with energy modulation agents in the medium

FIG. 15 is a schematic depicting x-ray scattering events and interactions with energy modulation agents in the medium. In one embodiment, the effect produced by the interactions of the x-rays and energy modulation agents with the medium occurs by pathways not yet certain where internally produced light (IR, visible, and/or UV) alone or in combination with the x-ray exposure drive a chemical reaction in the medium or to the energy modulation agents themselves. These pathways may be influenced by the generation of free radicals inside the medium. These pathways may alternatively, or in addition, be influenced by the generation of ionized species inside the medium. These pathways include the disassociation of salts that in turn create a desirable chemical reaction. These pathways may be influenced by the scattering of x-rays inside the medium. These pathways may be influenced by the generation of emitted and re-emitted light inside the medium. These pathways may be a combination of these factors.

Further, these pathways may include the in situ generation of singlet oxygen and/or ozone to produce a change in the medium. For example, the photoactivatable agents may be stimulated through mechanisms such as irradiation, resonance energy transfer, exciton migration, ion-exchange, free radicals, electron injection, or chemical reaction to where "activated" agent is capable of producing the predetermined change desired.

In another embodiment, clusters of energy modulations agents (or chemically reactive agents or plasmonic agents) may be provided to a local site where x-ray exposure or internally generated light breaks apart the clusters into a form more useful to treatment at the local site or more useful to generating a local change in the medium nearby where the clusters existed.

Coatings on Phosphors that can Yield Easier Degradation

Some phosphor coating can participate in the initial curing and break the crosslinks by virtue of breaking the coating. For example, the use of a coating susceptible to cleavage by an applied radiation can lead to compositions that can be cured by one wavelength of applied radiation (which does not affect the coating), and de-bonded or deconstructed by application of a different radiation causing the phosphor coating to break, and thus creating weaknesses in the previously cured material.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for depolymerization of a polymeric article, wherein the polymeric article comprises a polymer and one or more energy modulation agents, comprising:
   applying an applied energy to the polymeric article, wherein the one or more energy modulation agents convert the applied energy into an emitted energy sufficient to cause depolymerization of the polymer, wherein the applied energy is x-rays, gamma rays, or electron beam and the emitted energy is UV.

2. The method of claim 1, wherein the polymeric article is a rubber article.

3. The method of claim 2, wherein the rubber article is a tire.

4. The method of claim 3, wherein the tire has previously undergone vulcanization.

5. The method of claim 2, wherein the rubber article has previously undergone vulcanization.

6. The method of claim 1, wherein the polymeric article is in the form of a layer or film on a substrate, wherein the decomposition of the layer or film creates a pressure sensitive adhesive layer on the substrate.

7. The method of claim 1, wherein the applied energy is x-rays.

8. The method of claim 7, wherein the x-rays have an energy of 1 MV or higher.

* * * * *

UNITED STATES PATENT AND TRADEMARK OFFICE
CERTIFICATE OF CORRECTION

PATENT NO. : 10,093,784 B2  
APPLICATION NO. : 15/590181  
DATED : October 9, 2018  
INVENTOR(S) : Zakaryae Fathi et al.

Page 1 of 1

It is certified that error appears in the above-identified patent and that said Letters Patent is hereby corrected as shown below:

In the Specification

Column 3, Line 41, "repesentation" should read --representation--

Column 4, Line 3, "medium" should read --medium.--

Column 6, Line 15, "(1O2)" should read --(1O2).--

Column 6, Line 16, "Decomposion" should read --Decomposition--

Column 6, Line 17, "species" should read --species.--

Column 11, Line 4, "(Cictrex (ICI)" should read --(Victrex (ICI))--

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*